(12) United States Patent
Argyropoulos et al.

(10) Patent No.: US 7,450,948 B2
(45) Date of Patent: Nov. 11, 2008

(54) METHOD AND APPARATUS FOR USE IN PROVISIONING RESOURCES FOR A BACKHAUL LINK

(75) Inventors: Yiannis Argyropoulos, Hoover, AL (US); Ramzi Barghouthi, Atlanta, GA (US); Ayman Mostafa, Smyrna, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 1019 days.

(21) Appl. No.: 10/758,374

(22) Filed: Jan. 15, 2004

(65) Prior Publication Data
US 2005/0159165 A1 Jul. 21, 2005

(51) Int. Cl.
*H04Q 7/20* (2006.01)
*H04B 7/212* (2006.01)

(52) U.S. Cl. .................. 455/452.1; 455/452.2; 455/450; 455/419; 455/428

(58) Field of Classification Search ............... 455/452.1, 455/452.2, 450, 418, 419, 428, 426.1, 437; 370/347, 465, 329, 332
See application file for complete search history.

(56) References Cited

U.S. PATENT DOCUMENTS

| 6,167,102 | A  | * | 12/2000 | Hellberg ..................... 375/376 |
| 6,400,928 | B1 | * | 6/2002 | Khullar et al. ............ 455/67.11 |
| 7,085,248 | B1 | * | 8/2006 | Holma et al. ............... 370/329 |
| 7,085,257 | B1 | * | 8/2006 | Karves et al. ............... 370/352 |
| 7,193,988 | B2 | * | 3/2007 | Niemela et al. ............. 370/347 |
| 2003/0227983 | A1 | * | 12/2003 | Milne et al. ................ 375/302 |

* cited by examiner

*Primary Examiner*—Melur Ramakrishnaiah
(74) *Attorney, Agent, or Firm*—Amin, Turocy & Calvin, LLP

(57) ABSTRACT

Determining the amount of resources that needs to be provisioned for a wired backhaul link of a wireless network using a probabilistic approach that makes the determination based at least in part on the type of coding scheme selection algorithm used to encode data transmitted by the transceiver to the wireless device over the air interface of the wireless network. Because the type of coding algorithm used depends on the amount of traffic at the air interface, variations in the coding algorithms used over a given period of time can be used to accurately determine the amount of bandwidth or resources that will be required on the backhaul link. Consequently, the amount of resources that should be provisioned for the backhaul link can be accurately determined.

18 Claims, 5 Drawing Sheets

METHOD AND APPARATUS FOR USE IN PROVISIONING RESOURCES FOR A BACKHAUL LINK

BACKGROUND OF THE INVENTION

1. Field of Invention

The present invention relates to wireless communications and, more particularly, to a method and an apparatus for determining the number of sub-rate channels needed for a backhaul link based on variations in the coding schemes used at the wireless system air interface.

2. Description of Related Art

In Global System For Mobile Communications (GSM) systems, a busy air interface timeslot occupies one sub-rate channel on the wired backhaul link (i.e., the Abis link), which is the link between the base station transceiver (BST) and the base station controller (BSC). This is not true for General Packet Radio Service (GPRS) and Enhanced Data GSM Environment (EDGE) systems. In GSM and EDGE systems, each air interface timeslot may require up to four sub-rate channels on the Abis link. The number of sub-rate channels required depends on the vendor's coding scheme selection algorithm. The data rate at the air interface varies with the coding scheme used because of the inverse relationship between the number of bits used for coding and the number of bits that can be included in the payload. Vendors often attempt to maximize the over-the-air data throughput of the wireless system by selecting the coding algorithm in accordance with changing conditions of the air interface. Fewer bits are used to encode the data during conditions of low interference than are used to encode the data during conditions of high interference.

The Abis link normally is provisioned by simply acquiring enough resources to support the worst case scenario. For example, because as many as four sub-rate channels could be required on the Abis link for each time slot of the air interface of an EDGE system, the number of sub-rate channels normally provisioned for the Abis link of an EDGE system is four. This type of provisioning method has obvious shortcomings. One major disadvantage of this provisioning method is that it often results more resources (e.g., T1 lines) being provisioned for the Abis link than is necessary.

A need exists for a backhaul provisioning technique that makes it possible to accurately determine the amount of resources that needs to be provisioned for the backhaul link.

SUMMARY OF THE INVENTION

In accordance with the present invention, the amount of resources that needs to be provisioned for a wired backhaul link of a wireless network is determined using a probabilistic approach that makes the determination based at least in part on the type of coding algorithm used to encode data transmitted by the transceiver to the wireless device over the air interface of the wireless network. Because the type of coding algorithm used depends on interference conditions at the air interface, variations in the coding algorithms used over a given period of time can be used to accurately determine the amount of bandwidth that will be required on the backhaul link. Consequently, the amount of resources that should be provisioned for the backhaul link can be accurately determined. To this end, the present invention provides a method and an apparatus for use in determining the amount of resources that need to be provisioned for the backhaul link of a wireless network. The present invention is not limited with respect to the type of network to be provisioned.

In the apparatus of the invention, first logic receives and stores information relating to the probability that one or more different coding algorithms were used over a given period of time to encode data transmitted by a transceiver of a wireless network to one or more wireless devices. Second logic of the apparatus then processes the information relating to usage of the different coding algorithms and determines, probabilistically, the amount of resources (e.g., the number of channels) that will be needed for the backhaul link, which typically is the Abis link between a base station transceiver (BST) and a base station controller (BSC). The backhaul link could instead be, for example, the link between a Node B transceiver of a Universal Mobile Telecommunications System (UMTS) wireless network and a Radio Network Controller (RNC) of the UMTS network. Another backhaul link that the present invention could be used to provision is the link between a transceiver of an access point (AP) of a wireless local area network (WLAN) and a BSC of the WLAN.

These and other features and advantages of the present invention will become apparent from the following description, drawings and claims.

DETAILED DESCRIPTION OF THE EXEMPLARY EMBODIMENTS

The present invention will now be described with reference to an embodiment in which an Abis link between a base station transceiver (BST) and a base station controller (BSC) is being provisioned. As stated above, the present invention is not limited with respect to the type of network that the present invention is used to provision. For example, the present invention may also be used to determine the amount of resources that needs to be provisioned for a link between a Node B transceiver and an RNC in a UMTS network and for a link between an AP transceiver and a BSC of a WLAN. However, in the interest of brevity, the present invention will be described only with reference to its use in determining provisioning of an Abis link of a GPRS or EDGE wireless network.

Figure 1:
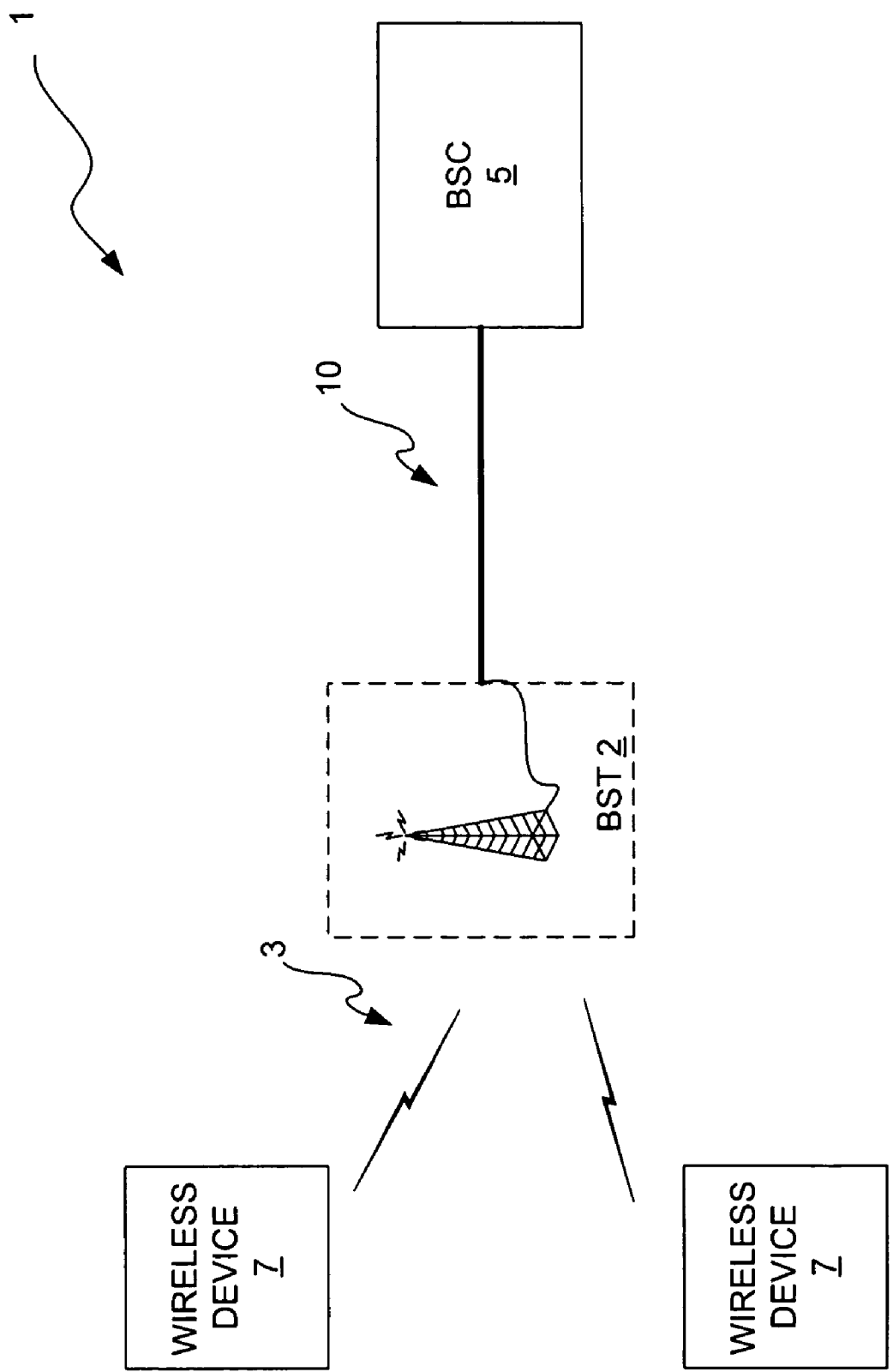
FIG. 1 is a block diagram of a wireless network having a backhaul link that is capable of being provisioned using the method and apparatus of the invention.

FIG. 1 is a block diagram of a wireless network 1 having a backhaul link 10 and an air interface 3. A BST 2 is connected by the backhaul link 10 to a BSC 5. The BST 2 communicates over the air interface 3 with wireless devices 7 (e.g., telephones, PDAs, etc.) by radio frequency (RF) signals. The RF signals are encoded by the BSC 5 before being transmitted by the BST 2 over the air interface 3. As stated above, the type of coding scheme used typically depends on the quality of the air interface 3, which depends on the amount of wireless traffic at the air interface 3. Although the transmitter is located at the BST 2, the data to be transmitted normally is encoded and decoded by the BSC 5.

As wireless signal quality increases, the BSC 5 will encode data to be transmitted using a coding scheme that uses a relatively large number of encoding bits. As wireless signal quality decreases, the BSC 5 will encode the data to be transmitted using a coding scheme that uses a relatively small number of encoding bits. Wireless signal quality depends on wireless traffic. Therefore, the coding scheme used is directly related to the amount of wireless traffic at the air interface. The wireless signal quality also depends on other factors, such as wireless noise, transmitted power levels, etc.

In accordance with the invention, it has been found that the amount of resources that needs to be provisioned for the backhaul link 10 can be estimated from information about variations in the coding schemes used over a given period of time. The information describing the variations in the coding schemes used can be obtained by taking measurements at the BSC 5 where the data is encoded. Alternatively, the information can be obtained through estimation, as described below in detail with reference to FIG. 2.

Figure 2:
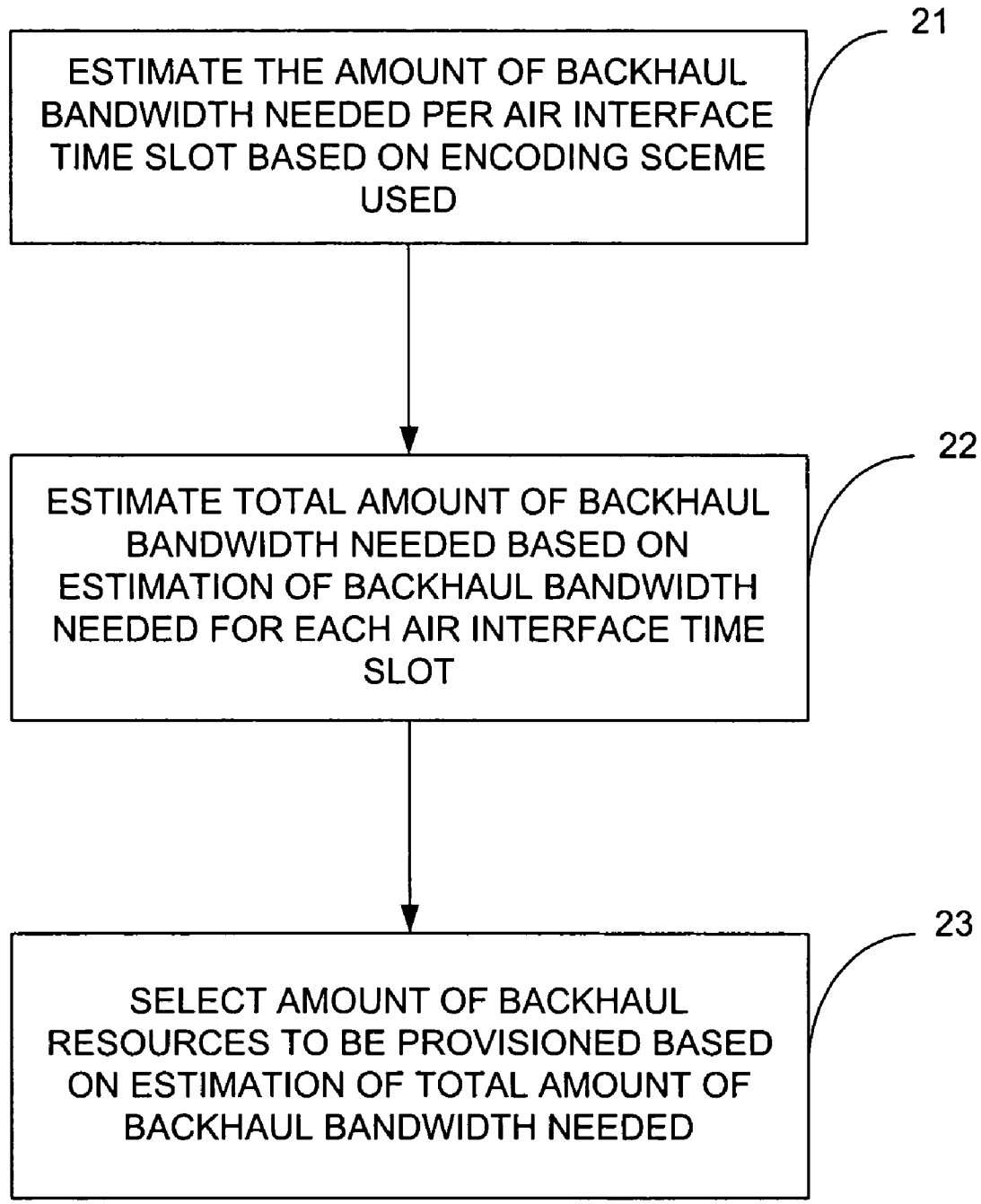
FIG. 2 is a flow chart of the method of the invention in accordance with an embodiment for determining the amount of resources that needs to be provisioned for a backhaul link.

FIG. 2 is a flow chart of the method of the invention in accordance with an embodiment. The method represented by the flow chart in FIG. 2 will also be described with reference to the graphs shown in FIGS. 3, 4 and 5. The first step in the method is to estimate the amount of backhaul bandwidth needed per air interface time slot, as indicated by block 21. For example, in a GPRS system each time slot on the air interface requires up to four sub-rate channels on the Abis link 10. In an embodiment where the network is a GPRS or EDGE network, step 21 corresponds to estimating the probability that an air interface time slot will require a particular number of sub-rate channels on the Abis link 10.

Figure 3:
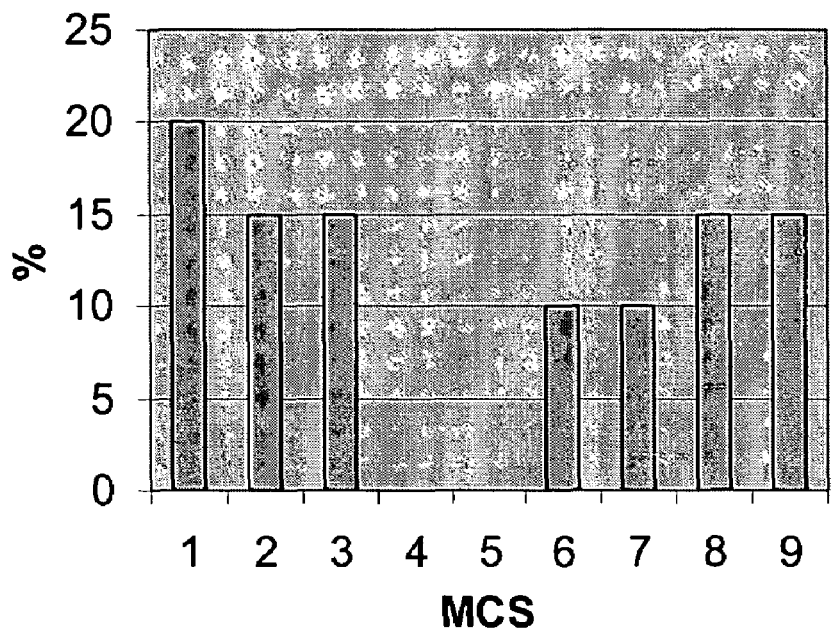
FIG. 3 is a graph illustrating the probabilities that various coding schemes were used to encode data transmitted over the air interface shown in FIG. 1 over particular periods of time.

The estimation represented by step 21 can be determined using a number of methods. FIG. 3 is a graph 30 illustrating the probability that a given MCS coding scheme is being used to encode data transmitted over one channel of the air interface over a given period of time. The probability percentage is shown on the vertical axis and the type of coding scheme used is shown on the horizontal axis. There are nine MCS coding schemes for EDGE and four for GPRS. The graph in FIG. 3 indicates that MCS coding scheme 1 was used approximately 20% of the time. MCS coding schemes 2, 3, 8 and 9 each were used approximately 15% of the time. MCS coding schemes 6 and 7 each were used approximately 10% of the time. The time period may be, for example, a few hours during which traffic over the air interface was high.

The percentage of the time that each coding scheme was used can be calculated based on the block error rate, which depends on the quality of the air interface, which, in turn, is based on the signal-to-(noise+interference) ratio at the air interface. The percentage of the time that each coding scheme was used over a given period of time can also be determined from statistics that are normally maintained at the BSC.

For each MCS coding scheme, it is known how many sub-rate channels on the backhaul link will be needed. This information is publicly available and is contained in the Third Generation Partnership Project (3GPP) standard. Below is a listing of the number of sub-rate channels required by the 3GPP standard for each MCS coding scheme:

| MCS | # sub-rate channels |
|---|---|
| 1 | 1 |
| 2 | 1 |
| 3 | 2 |
| 4 | 2 |
| 5 | 2 |
| 6 | 2 |
| 7 | 3 |
| 8 | 4 |
| 9 | 4 |

Figure 4:
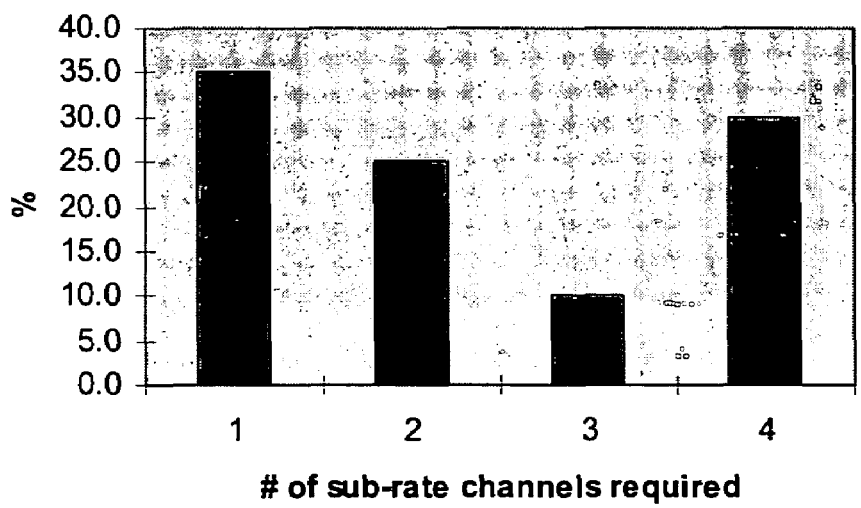
FIG. 4 is a graph illustrating the probability distribution that certain numbers of backhaul link channels will be needed per air interface channel for certain coding schemes.

Based on the information shown in FIG. 3, a determination is made of the percentage probability that a particular number of sub-rate channels on the backhaul link will be needed. To accomplish this, the results shown in FIG. 3 are added together for like coding schemes to obtain the results shown in FIG. 4. For example, FIG. 3 shows a 20% probability and a 15% probability that MCS coding schemes 1 and 2, respectively, were used over a given period of time. Consequently, FIG. 4 shows an aggregate 35% probability that one sub-rate channel on the backhaul link will be needed per air interface time slot. Similarly, FIG. 3 shows a 15% probability, a 0% probability, a 0% probability and a 10% probability that MCS coding schemes 3, 4, 5 and 6, respectively, were used over a given period of time. Consequently, FIG. 4 shows an aggregate 25% probability that two sub-rate channels on the backhaul link will be needed per air interface channel. In a similar manner, the probabilities that three and four sub-rate channels are needed per air interface time slot are determined.

Figure 5:
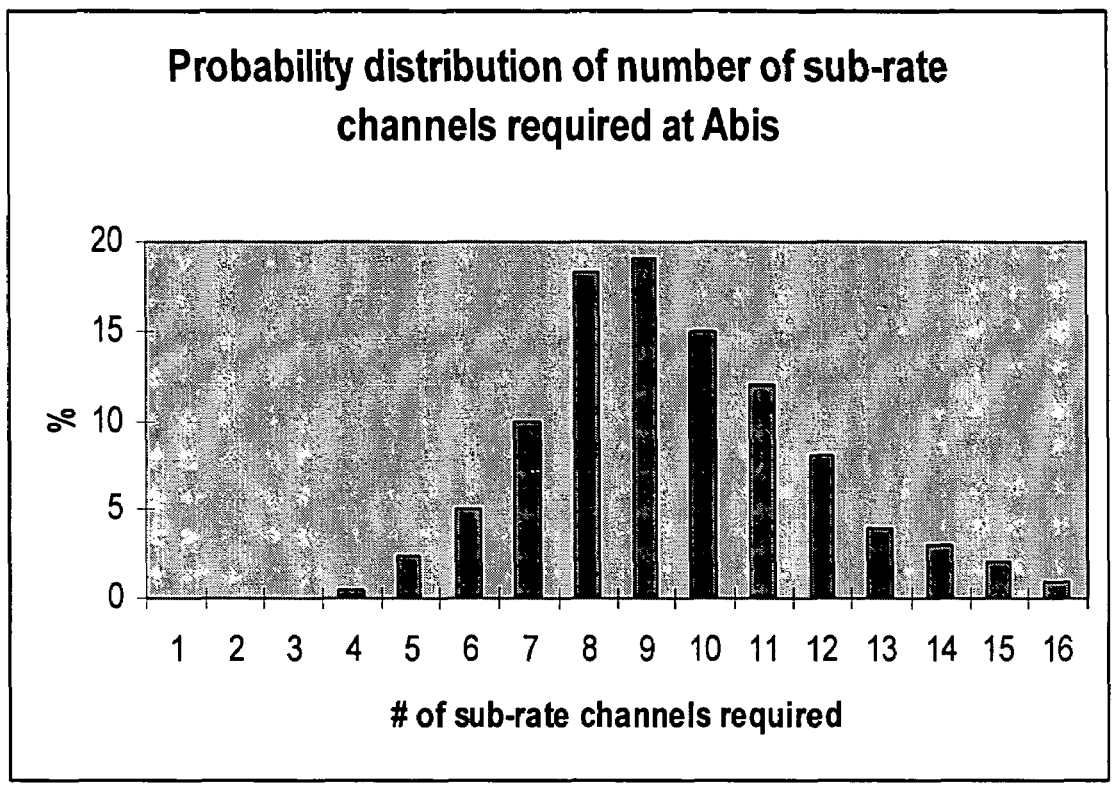
FIG. 5 is a graph illustrating the probability that a total number of backhaul link channels will need to be provisioned for the total number of air interface channels.

Once probability distributions of the type shown in FIG. 4 have been obtained for multiple timeslots, the probability distributions are used to estimate the total amount of backhaul bandwidth that will be needed, as indicated by block 22 in FIG. 2. This is accomplished using an estimation algorithm such as, for example, convolution or the central-limit theorem. FIG. 5 shows a graph illustrating the results of convolving multiple probability distributions of the type shown in FIG. 4 together. From the graph shown in FIG. 5, it can be seen that at most sixteen sub-rate channels will be needed on the backhaul link for all of the channels on the air interface. The amount of resources that needs to be provisioned for the backhaul link is then selected based on the results of the estimation algorithm, as indicated by block 23 in FIG. 2. In this example, the backhaul link preferably would be provisioned with resources to provide it with sixteen channels, which is the maximum number of channels that may be needed.

The manner in which convolution may be used to obtain the results shown in FIG. 5 is demonstrated by the following mathematical equation. The convolution of two discrete random variable functions f(x) and g(x) is defined as:

$$h(i) = \sum_{x=-\infty}^{\infty} f(x)g(i-x), \qquad \text{(Equation 1)}$$

where f(x) and g(x) are both probability distribution functions of the type represented by the graph shown in FIG. 4 for respective timeslots (e.g., different wireless devices communicating with the BST 2). In accordance with the invention, f(x) and g(x) may be identical, because they refer to the statistical properties of different timeslots, which are most probably (but not necessarily) identical. The variable x corresponds to the number of sub-rate channels, which corresponds to the horizontal axis in FIG. 4. The variable i corresponds to the total number of sub-rate channels, which corresponds to the horizontal axis in FIG. 5. In accordance with the convolution algorithm of the invention, the summation is from x equal 0 to x equal twice the maximum value for x for which either of the two distributions f(x) and g(x) has a non-zero value. By convolving the probability distributions together in this manner, the results shown in FIG. 5 are obtained.

The central-limit theorem states that the summation of n independent, identically distributed (iid) random variables with mean $\mu$ and variance $\sigma^2$ tends to be a Gaussian random variable with mean $n\mu$ and variance $n\sigma^2$. If the number of air interface timeslots is large enough (usually above 12-15), in order to reduce complexity and computational load, a Gaussian distribution can be used with the above mean and variance characteristics to generate the results shown in FIG. 5. Therefore, once the results shown in FIG. 4 have been obtained in the manner described above, those results can be processed to obtain a Gaussian distribution of the type shown in FIG. 5. From the results shown in FIG. 5, the maximum number of sub-rate channels that may be needed can be readily ascertained (i.e., sixteen in this example). The manner in which Gaussian distributions are calculated is well known. Therefore, the manner in which the information contained in the graph shown in FIG. 4 is converted into a Gaussian distribution will not be described.

Figure 6:
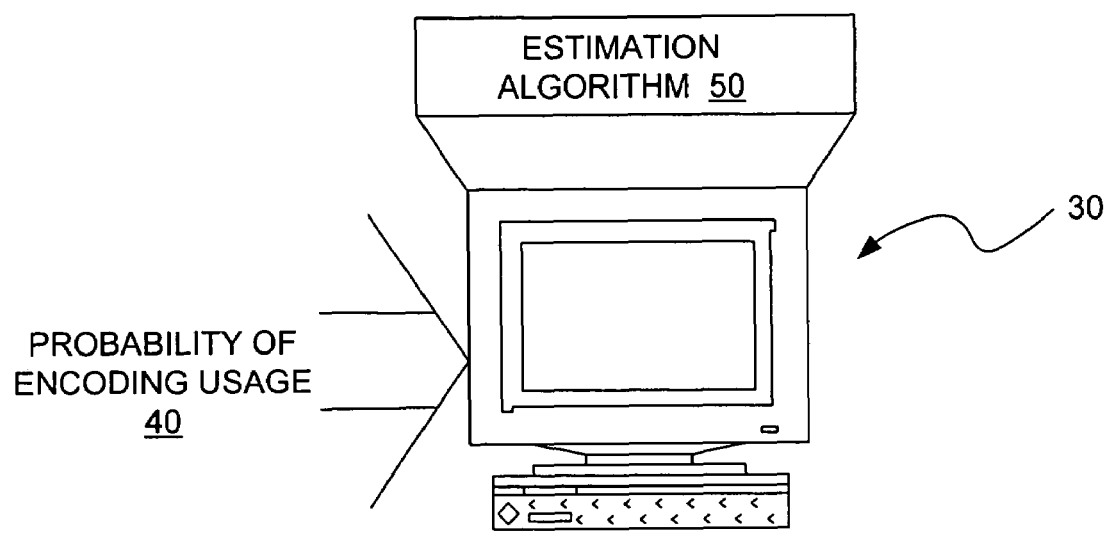
FIG. 6 is a block diagram of the apparatus of the invention in accordance with an embodiment.

FIG. 6 is a block diagram of the apparatus of the present invention in accordance with an embodiment. A computer 30 receives information 40 relating to the probability that particular coding schemes were used over a particular period of time to encode data transmitted over multiple channels of the air interface to multiple respective users. The computer 30 executes an estimation algorithm 50 (e.g., convolution, central theorem, etc.) that processes the information 40 in the manner described above with reference to FIGS. 2-5 to determine the probability distribution that a given number of sub-rate channels are needed on the backhaul link for the total number of air interface channels. This information may then be displayed to a user to enable the user to determine the amount of resources that is needed for the backhaul link.

It should be noted that although the present invention has been described with reference to particular embodiments, the present invention is not limited to the embodiments described herein. Modifications can be made to the embodiments described herein and all such modifications are within the scope of the invention.

What is claimed is:

1. An apparatus for determining an amount of resources to be provisioned for a wired communication link of a wireless network, the apparatus comprising:
   first logic configured to receive and store information relating to a type of coding algorithm used to encode data communicated between a wireless network transmitter and a wireless device; and
   second logic configured to process the information relating to the coding algorithm used to determine a probability that a given amount of resources will need to be provisioned for the wired communication link,
   wherein said information is obtained at a base station controller by obtaining statistics relating to different types of coding algorithms that the base station controller used over a given period of time to encode data transmitted between the transmitter and the wireless device.

2. The apparatus of 1, wherein the second logic uses a convolution algorithm to process the information relating to the coding algorithm being used to determine said probability.

3. The apparatus of claim 1, wherein the second logic uses a central-limit theorem algorithm to process the information relating to the coding algorithm being used to determine said probability.

4. The apparatus of claim 1, wherein the apparatus is a computer, the first logic being a memory element of the computer configured to store said information and the second logic being a processor of the computer programmed to process said information to determine said probability.

5. The apparatus of claim 1, wherein the transceiver is a transceiver of a base station of a wireless network, and wherein said wired communication link is an Abis link between the base station transmitter and a base station controller of the wireless network.

6. The apparatus of claim 1, wherein the wireless network is a Universal Mobile Telecommunications System (UMTS) wireless network, said wired communication link being a wired LUB link between a Node B of a UMTS network and a Radio Network Controller of the UMTS network.

7. The apparatus of claim 1, wherein the wireless network is a wireless local area network (WLAN), the transmitter being a transmitter of an access point of the wireless local area network (WLAN).

8. A method for determining an amount of resources to be provisioned for a wired communication link of a wireless network, the method comprising:
   obtaining information relating to a probability that one or more types of coding algorithms were used to encode data communicated between a transmitter of the wireless network and one or more wireless devices by measuring different types of coding algorithms that a base station controller used over a given period of time to encode data transmitted between the transceiver and the wireless device;
   after obtaining said information, receiving and storing said information ;and
   processing the information to determine a probability that a given amount of resources will be needed for the communication link.

9. The method of claim 8, wherein said processing includes using a convolution algorithm.

10. The method of claim 8, wherein said processing includes using a central-limit theorem.

11. The method of claim 8, wherein the wired communication link is an Abis link between a base station transceiver and a base station controller.

12. The method of claim 8, wherein the transmitter is part of a transceiver of a base station of a wireless network, and wherein said communication link is a wired Abis link between the base station transceiver and a base station controller of the wireless network.

13. The method of claim 8, wherein the wireless network is a Universal Mobile Telecommunications System (UMTS) wireless network, said communication link being a wired LUB link between a Node B of a UMTS network and a Radio Network Controller of the UMTS network.

14. The method of claim 8, wherein the wireless network is a wireless local area network (WLAN), the transmitter being part of a transceiver of an access point of the wireless local area network (WLAN).

15. A method for determining an amount of resources to be provisioned for a wired communication link of a wireless network, the method comprising:

obtaining information relating to a probability that one or more types of coding algorithms were used to encode data communicated between a transmitter of the wireless network and one or more wireless devices by calculating, based on a quality of an air interface between the transmitter and the wireless devices, different types of coding algorithms that a base station controller used over a given period of time to encode data transmitted between the transceiver and the wireless device;

after obtaining said information, receiving and storing said information; and processing the information to determine a probability that a given amount of resources will be needed for the communication link.

16. A computer program for determining an amount of resources to be provisioned for a wired communication link of a wireless network, the program being embodied on a computer-readable medium, the program comprising:

a first code segment for receiving and storing information relating to a probability that one or more types of coding algorithms were used over a given period of time to encode data communicated over an air interface between a transmitter of the wireless network and one or more wireless devices, wherein said information is obtained at a base station controller by obtaining statistics relating to different types of coding algorithms that the base station controller used over a given period of time to encode data transmitted between the transmitter and the wireless device; and a second code segment for processing said information to determine a probability that a given amount of resources will be needed for the wired communication link.

17. The program of claim 16, wherein the second code segment comprises code for performing a convolution algorithm.

18. The program of claim 16, wherein the second code segment comprises code for performing a central-limit algorithm.

* * * * *